United States Patent
Matos da Silva et al.

(10) Patent No.: US 6,872,481 B2
(45) Date of Patent: Mar. 29, 2005

(54) PROCESS FOR UTILIZATION OF A COLD-FLAME VAPORIZER IN AUTO-THERMAL REFORMING OF LIQUID FUEL

(75) Inventors: Jader Matos da Silva, Mainz (DE); Ingo Hermann, Mainz (DE)

(73) Assignee: General Motors Corporation, Detroit, MI (US)

( * ) Notice: Subject to any disclaimer, the term of this patent is extended or adjusted under 35 U.S.C. 154(b) by 181 days.

(21) Appl. No.: 10/186,083

(22) Filed: Jun. 28, 2002

(65) Prior Publication Data

US 2004/0001983 A1 Jan. 1, 2004

(51) Int. Cl.[7] .............................................. H01M 8/06
(52) U.S. Cl. ....................................................... 429/17
(58) Field of Search ....................... 429/17, 26; 423/650

(56) References Cited

U.S. PATENT DOCUMENTS

| | | | |
|---|---|---|---|
| 3,976,507 A | * 8/1976 | Bloomfield | .................. 429/17 |
| 5,496,859 A | * 3/1996 | Fong et al. | .................. 518/703 |
| 5,595,833 A | 1/1997 | Gardner et al. | |
| 2001/0047622 A1 | * 12/2001 | Yamaoka et al. | ......... 48/197 R |

FOREIGN PATENT DOCUMENTS

| | | |
|---|---|---|
| DE | 198 60 308 | 8/2000 |
| WO | WO 00/06948 A1 * | 2/2000 ........... F23C/11/00 |
| WO | WO 01/55026 A1 * | 8/2004 .............. C91B/3/32 |

OTHER PUBLICATIONS

L. Blomen et al. "Fuel Cell Systems", 1993, Plenum Press, pp. 216–225.*

International Search Report dated Oct.9, 2003.

* cited by examiner

Primary Examiner—Gregg Cantelmo
(74) Attorney, Agent, or Firm—Harness, Dickey & Pierce, P.L.C.

(57) ABSTRACT

A fuel processing sub-system is provided and includes a cold-flame vaporizer in fluid communication with an auto-thermal reformer. The cold-flame vaporizer operates within a temperature range of approximately 310° C. to 500° C. for enabling a cold-flame reaction, whereby partial oxidization of a volume of fuel occurs for producing heat. The produced heat is used to vaporize the remaining volume of fuel and superheat a volume of saturated steam supplied to the cold-flame vaporizer. The vaporized fuel, water (steam) and a supply of air are efficiently mixed within the cold-flame vaporizer for supply to the auto-thermal reformer at a temperature below 500° C. In order to ensure the cold-flame reaction, the cold-flame vaporizer is operated with an O/C ratio of 0.5 to 2.3, an S/C ratio of 1.5 to 3.0 and a pressure of 1.5 to 3.0 bar-g. In this manner, turndown ratios are achievable for applications having transient power demands.

7 Claims, 5 Drawing Sheets

Timeframe 15 Minutes

Timeframe 20 Minutes

US 6,872,481 B2

PROCESS FOR UTILIZATION OF A COLD-FLAME VAPORIZER IN AUTO-THERMAL REFORMING OF LIQUID FUEL

FIELD OF THE INVENTION

The present invention relates to fuel reformation for use in a fuel cell system and more particularly to implementation of a cold-flame vaporizer to provide a vaporized mixture for reformation in an auto-thermal reformer.

BACKGROUND OF THE INVENTION

Fuel cell systems have been proposed as power sources for a varying number of applications, including mobile, vehicular applications. Generally, a fuel cell system includes a fuel cell stack that uses hydrogen to produce an electrical current for powering an external device. The hydrogen may be supplied to the fuel cell stack directly from a hydrogen source. However, because of complications associated with storage of a pure hydrogen source within a vehicle, it is more practical that the hydrogen is provided through the reformation of a hydrocarbon fuel. To this end, an auto-thermal reformer is implemented for reforming the hydrocarbon fuel to produce a reformate stream having a hydrogen component.

Traditionally, vaporized fuel, water (as steam) and air are provided as a mixture from a mixing unit to the auto-thermal reformer. The fuel and water are converted from liquid to vapor form through a vaporization process performed within either independent or combined vaporizers. Typically, a combustor is provided for producing hot combustion gases to sufficiently heat the vaporizer(s), enabling the vaporizer(s) to vaporize the liquid fuel and water channeled therethrough. The vaporized fuel and water (now steam) are channeled into a mixing unit for mixture with air, and further channeled into the auto-thermal reformer for reformation.

Such traditional vaporization systems include significant disadvantages. For example, because the vaporizing energy is provided by an external component (i.e. combustor), modulation of the fuel flow, as a function of system demand, is limited. In other words, the turndown dynamics of traditional systems is limited, whereby the variation of mass flux through the vaporizer and mixing units is unable to achieve the required turndown ratio in response to rapid total mass flux through the auto-thermal reformer (as a function of power demand). Another disadvantage of such systems is that soot tends to form within the mixing unit, thereby inhibiting the proper operation of the system. Further, the operational parameters (i.e. temperatures greater than 500° C.) of traditional vaporization systems may result in auto-ignition of the mixture, prior to entering the auto-thermal reformer. Ignited mixtures reaching the auto-thermal reformer can damage the catalyst therewithin and results in inefficient, undesirable reformation reactions. Presently, to avoid auto-ignition a complex control strategy for volume flows into the auto-thermal reformer is employed. This increases the cost and complexity of the fuel cell system.

It is known in the art to implement a cold-flame vaporizer in a system where fuel is oxidized to enable partial conversion of the fuel. However, such applications rely on significant pre-heating of input streams, coupled with strict control of residence time in a reaction chamber, flow control of inerts or transfer of heat to the reaction chamber heat sink to control fuel conversion and prevent auto-ignition. This type of system is disclosed in German Publication No. DE 198 60 308. These strict control requirements pose disadvantages, particularly in cases where fuel conversion forms a part of a larger system, where cost, complexity, operable flexibility and system integration issues are important.

Therefore, it is desirable in the industry to provide an improved vaporizer and vaporization process that alleviates the disadvantages of traditional vaporizers and processes.

SUMMARY OF THE INVENTION

Accordingly, the present invention provides a fuel reformer for producing a reformate stream for utilization in a fuel cell. The fuel reformer includes a fuel inlet for supplying a flow of liquid fuel into the fuel reformer, an oxidizer inlet for supplying a flow of oxidizer into the fuel reformer, a vaporizer for partially oxidizing the flow of liquid fuel to generate heat for vaporizing a remaining flow of the liquid fuel for producing vaporized fuel. The vaporizer operates within an oxygen to carbon, molar ratio range of 0.5 to 2.3. That is, in a range from 0.5 mole oxygen for every 1 mole of carbon to 2.3 moles of oxygen for every 1 mole of carbon. The fuel reformer further includes an auto-thermal reformer in fluid communication with the vaporizer for reforming the vaporized fuel to produce the reformate stream. Additionally, the fuel reformer includes a steam inlet for supplying a flow of saturated steam into the fuel reformer, wherein the flow of saturated steam is superheated utilizing the generated heat, whereby the vaporizer operates within a steam to carbon, molar ratio range of 1.5 to 3.0. That is, 1.5 moles of steam ($H_2O$) for every 1 mole of carbon, up to 3.0 moles of steam for every 1 mole of carbon. It is further preferred that the vaporizer operates within a pressure range of approximately 1.5 to 3.0 bar-gauge.

The present invention further provides a method of reforming a liquid fuel to a reformate stream, including the steps of: providing a cold-flame vaporizer, supplying a flow of the liquid fuel and a flow of oxidizer into the cold-flame vaporizer, controlling an oxygen to carbon, molar ratio within the cold-flame vaporizer within a range of 0.5 to 2.3, oxidizing a portion of the liquid fuel within the cold-flame vaporizer for generating heat, the heat vaporizing the remaining liquid fuel, thereby producing vaporized fuel, and reforming the vaporized fuel within an autothermal reformer. The present invention further anticipates the steps of supplying a flow of saturated steam into the cold-flame vaporizer, superheating the flow of saturated steam utilizing energy from the generated heat, and controlling a steam to carbon, molar ratio within said cold-flame vaporizer within a range of 1.5 to 3.0. It is also preferred to control a pressure within the cold-flame vaporizer within a range of approximately 1.5 to 3.0 bar-gauge.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
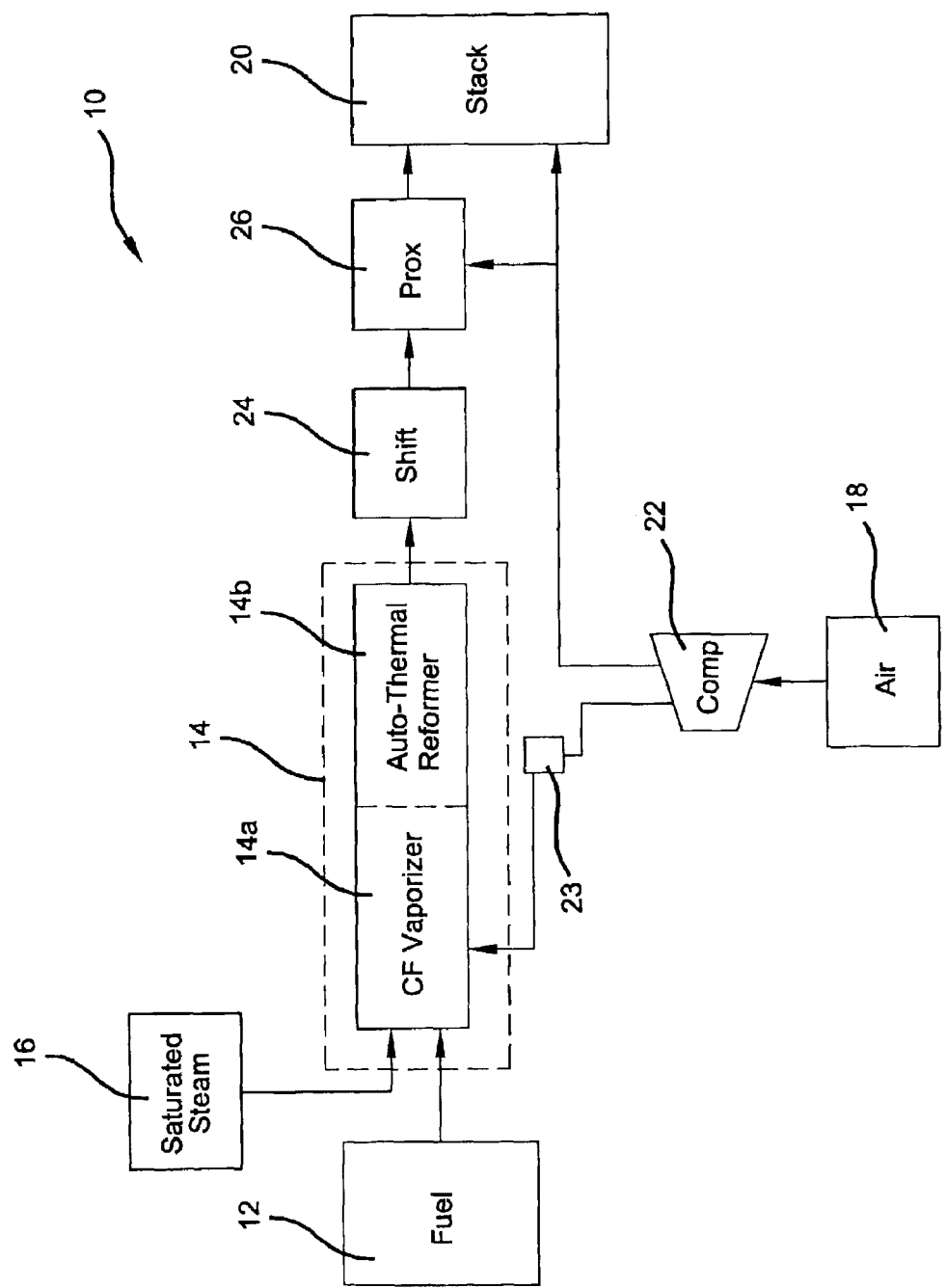
FIG. 1 is a schematic view of a fuel cell system implementing a preferred fuel processing sub-system having a combination cold-flame vaporizer/auto-thermal reformer in accordance with the principles of the present invention.

With reference to FIG. 1, an exemplary fuel cell system 10 is shown. The system 10 includes a fuel tank 12 for supplying a hydrocarbon fuel, such as, but not limited to gasoline ($C_{7.45}H_{14.5}$), to a fuel processing sub-system 14 including a combination cold-flame vaporizer and auto-thermal reformer constructed in accordance with the principles of the present invention. The sub-system 14 includes a cold-flame vaporizer (CFV) 14a in fluid communication with an auto-thermal reformer (AR) 14b. Further, a saturated steam source 16 and an air source 18 are also included for respectively providing saturated steam and air to the CFVAR 14. Air is further supplied to a fuel cell stack 20, as described in further detail hereinbelow, and is driven through the system by a compressor 22. An air pre-heater 23 is also provided for preheating the air supplied to the sub-system 14. It is anticipated that the pre-heater 23 is a conventional pre-heater, including, but not limited to, an electric pre-heater.

The auto-thermal reformer 14b disassociates the hydrocarbon fuel using steam and air that react with the hydrocarbon fuel for producing a hydrogen-rich reformate. In an ideal auto-thermal reformer, two reactions occur: partial oxidation (POx) and steam reforming (SR). The heat balance of these processes is preferably neutral, whereby the partial oxidization reaction produces heat used by the steam reforming reaction. These reactions are provided as:

POx: $C_nH_m + (n/2)O_2 \leftrightarrow nCO + (m/2)H_2$

SR: $C_nH_m + nH_2O \leftrightarrow nCO + (n+m/2)H_2$

As indicated by the above equations, an ideal reformation process yields a reformate gas comprising hydrogen and carbon monoxide. However, a practical reformation process yields additional by-products including carbon dioxide, nitrogen and water. The efficiency of the auto-thermal reformer 14b is a function of the $H_2$ yield and is dependent upon the temperature at which the inlet mixture (i.e. fuel, steam and air) enters the auto-thermal reformer 14b. If the inlet temperature of the mixture is less than 150° C., less $H_2$ and CO are formed and thus, the efficiency is low. The efficiency of the auto-thermal reformer 14b reaches a peak at an inlet mixture temperature 350° C., above which no substantial efficiency is achievable.

Even operating at a high efficiency, the carbon monoxide content of the reformate stream is generally of too high a level, whereby use in the fuel cell stack 20 would result in the fuel cell stack 20 being poisoned. Therefore, from the auto-thermal reformer 14b, the produced reformate stream flows to a water-gas-shift (WGS) reactor 24 and further into a preferential oxidization (PROX) reactor 26 for reducing the carbon monoxide content to an acceptable level.

Within the WGS reactor 24, water (as steam) is added to the reformate provided from the auto-thermal reformer 14b in the presence of a suitable catalyst, thereby lowering its temperature and increasing the steam to carbon (S/C) ratio therein. A higher S/C ratio serves to lower the carbon monoxide content of the reformate according the following ideal shift reaction: $CO + H_2O \rightarrow CO_2 + H_2$. In this manner, the amount of carbon monoxide is reduced, however, not enough for the reformate stream to be safe for use in the fuel cell stack 20.

The PROX reactor 26 is provided for further reducing the carbon monoxide content to an acceptable level for use in the fuel cell stack 20. The reformate stream exiting the WGS reactor 24 enters the PROX reactor 26 where it is catalytically reacted with oxygen, supplied in the form of air from the air source 18, according to the following reaction: $CO + \frac{1}{2}O_2 \rightarrow CO_2$. The reformate stream then flows from the PROX reactor 26 to the fuel cell stack 20 for generating electric energy.

Figure 2:
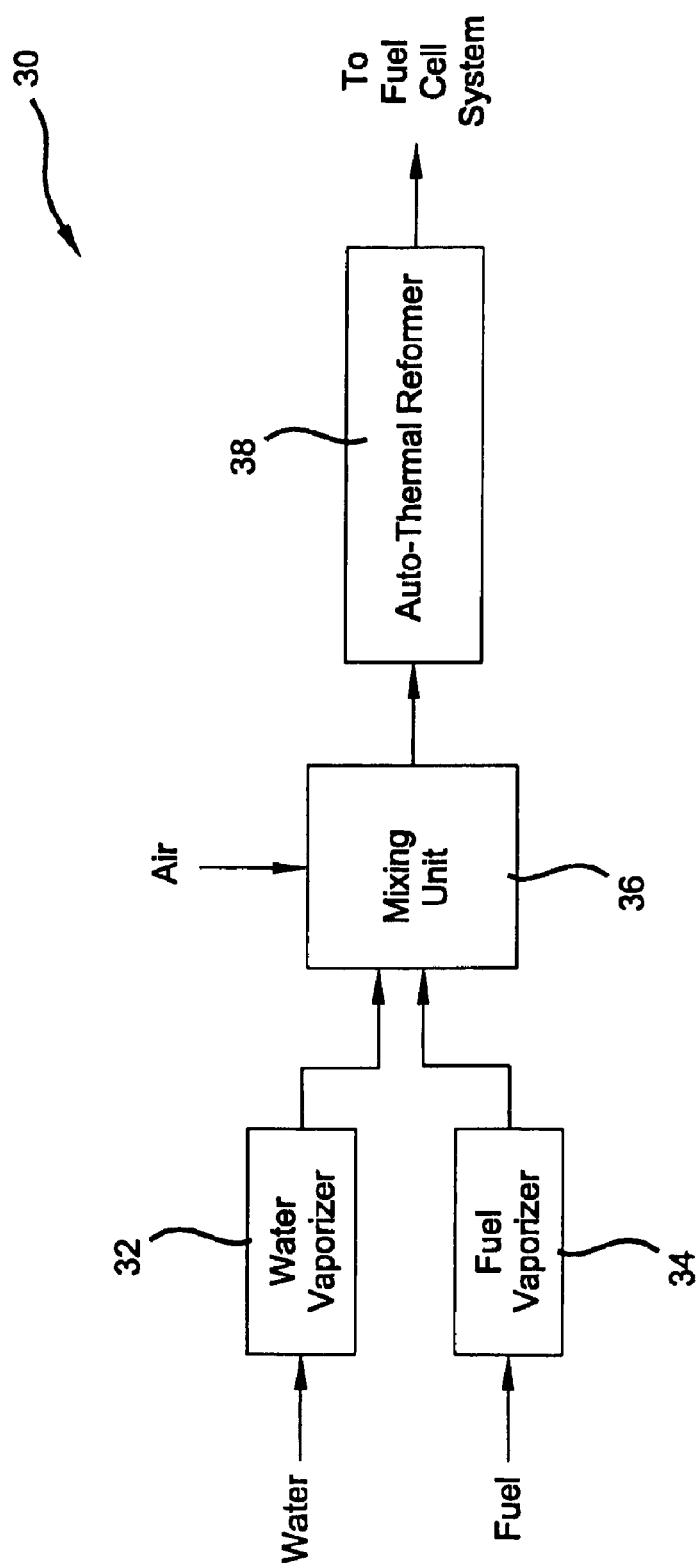
FIG. 2 is a schematic view of a traditional system for vaporizing fuel for reformation in an auto-thermal reformer.

With reference to FIG. 2, a traditional fuel processing sub-system 30 is shown, generally including independent water and fuel vaporizers 32,34, respectively, a mixing unit 36 and an auto-thermal reformer 38. The traditional sub-system 30 further includes a combustor (not shown) supplying hot combustion gases to the vaporizers 32,34 for providing vaporizing heat energy. As noted by way of background, the traditional sub-system 30 includes multiple components, requiring significantly more packaging space within a vehicle.

Figure 3:
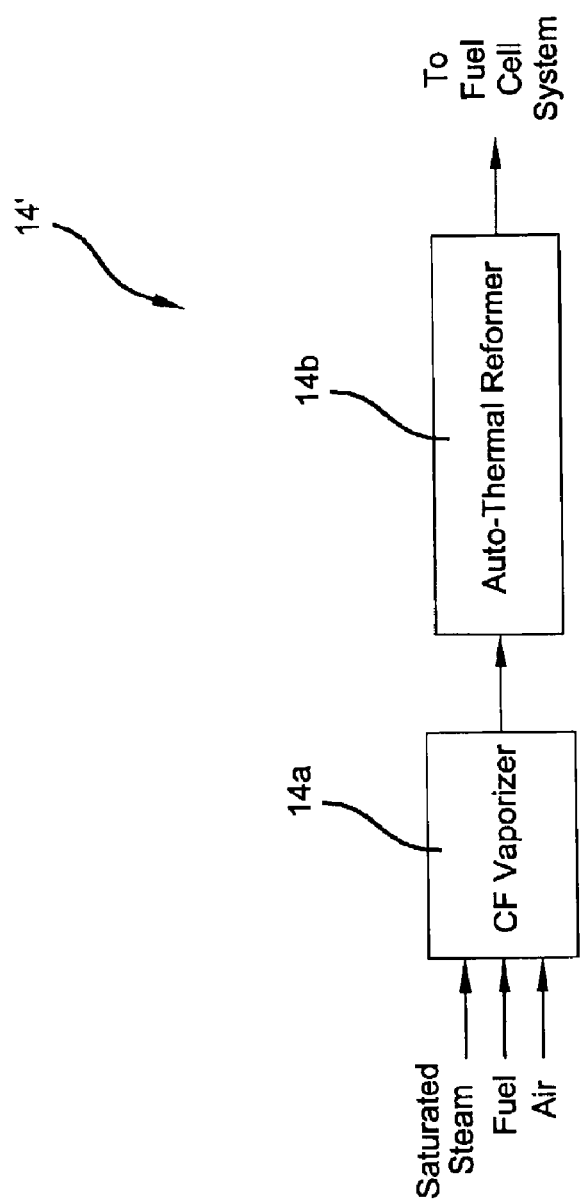
FIG. 3 is a schematic view of an alternative fuel processing sub-system implementing the cold-flame vaporizer and the auto-thermal reformer.

As discussed by way of background, traditional vaporization and mixing systems, such as the sub-system of FIG. 2, include significant disadvantages. With reference to FIGS. 1 and 3, the present invention provides sub-systems 14,14', respectively, for alleviating these disadvantages. In particular, the present invention includes the cold-flame vaporizer 14a for vaporizing fuel and superheating the saturated steam. The cold-flame vaporizer 14a relieves the need for the combustor, as explained in further detail below. Further, the cold-flame vaporizer 14a acts to sufficiently mix the vaporized fuel and steam, thereby relieving the need for the independent mixer. As detailed in FIG. 3, the cold-flame vaporizer 14a may be independent of and in fluid communication with the auto-thermal reformer 14b. However, as detailed in FIG. 1, it is preferred that the cold-flame vaporizer 14a and the auto-thermal reformer 14b be incorporated into a single unit. In this manner, a reduction in overall system size is achievable.

The cold-flame vaporizer 14a intakes air, fuel and saturated steam for vaporizing the fuel and superheating the saturated steam therein. The cold-flame vaporizer 14a combusts or at least partially (oxidizes) a portion of the fuel, approximately 3–5% by volume, and generally less than 10% by weight. In particular, the pre-vaporized mixture within the cold-flame vaporizer 14a is generally fuel rich with a relative volume of air below a flammability limit of the overall mixture. In this manner, there is insufficient air to enable combustion of the entire volume of mixture. This oxidization process provides sufficient heat energy to vaporize the remaining fuel and superheat the incoming saturated steam, for mixture with the air therein. In order to achieve oxidization of a limited volume of fuel, the cold-flame vaporizer 14*a* must maintain specific environmental conditions therewithin, as described in further detail herein.

Generally, the cold-flame vaporizer 14*a* is characterized by partial oxidation of a fuel/air mixture using a low temperature flame, within a specified temperature range. This temperature range is provided as approximately 310° C. to 500° C. Below 310° C. no oxidization reaction is possible, however, above 500° C. auto-ignition of the mixture within the cold-flame vaporizer 14*a* would occur. The partial oxidization reaction is exothermic and entails partial $O_2$ consumption and partial fuel conversion. The heat released from the partial oxidization reaction is used within the cold-flame vaporizer 14*a* to vaporize the remaining fuel and superheat the saturated steam therewithin. It should be noted that the cold-flame oxidization reaction is kinetically limited, whereby a temperature increase is achieved without ignition of the resultant fuel/air mixture. As a result, the modulation capability is not limited and a broad range of turndown ratios are achievable. Thus, the temperature of the resultant mixture is practically constant, regardless of capacity variation through the cold-flame vaporizer 14*a*. As discussed above, efficient reformation within the auto-thermal reformer 14*b* requires the resultant mixture from the cold-flame vaporizer 14*a* to be at a temperature greater than 350° C. Because the temperature of the outlet mixture of the cold-flame vaporizer 14*a* achieves this temperature, it is practical to integrate the cold-flame vaporizer 14*a* and the auto-thermal reformer 14*b* in a single unit. Further, the temperature and consistency in temperature of the resultant mixture enable optimized reformation within the auto-thermal reformer 14*b*.

As mentioned above, specific environmental parameters need be met in order for the cold-flame vaporizer 14*a* to operate within the above-described temperature range. These environmental parameters include: oxygen to carbon ratio (O/C), steam to carbon ratio (S/C) and pressure. The O/C and S/C ratios are molar ratios. Molar ratios are preferable over volumetric ratios as they are independent of other systems parameters (e.g. pressure and temperature). The pressure must be below the flammability limit of the overall mixture, at the selected O/C ratio. That is, the pressure is not sufficient to cause auto-ignition of the mixture. Pressure units herein are expressed as bar-g (bar gauge). Through theoretical calculation and experimental confirmation, the present invention provides the parameters as follows:

O/C=0.5–2.3

S/C=1.5–3.0

Pressure=1.5–3.0

Variation from these parameters, specifically the O/C and S/C ratios, may result in either suppression of the reaction or increased temperature. Suppression of the reaction results from flooding of the auto-thermal reformer 14*b* and increased temperature could cause auto-ignition of the vaporized mixture.

The characteristic temperature of the cold-flame is defined by the limited reaction kinetics, whereby the oxidization reaction stabilizes under the defined parameters of O/C, S/C and pressure. An increase in pressure within the cold-flame vaporizer 14*a* results in a temperature increase therewithin. Similarly, a temperature increase is achieved through a reduction in the O/C ratio, whereby the partial pressure of the hydrocarbons (fuel) increases the overall pressure. A temperature reduction is seen through an increase in the S/C ratio, whereby the partial pressure of the hydrocarbons (fuel) decreases the overall pressure. In this manner, the environmental parameters are linked. It should also be noted that the characteristic temperature of the cold-flame vaporizer 14*a* is also dependent upon the flow within the cold-flame vaporizer 14*a*. For example, implementation of a recirculation structure (not shown), results in lower cold-flame temperatures. Although the O/C and S/C ranges provided by the present invention are somewhat fixed for maintaining the cold-flame at a functional temperature, it is anticipated that the pressure may be variable above or below the indicated range by approximately 10 to 30%.

Operation of the cold-flame vaporizer 14*a* is not only dependent upon the operating parameters discussed above, but also the temperature at which the air enters the cold-flame vaporizer 14*a*. The air pre-heater 23 controls the inlet temperature of the air into the cold-flame vaporizer 14*a* for ensuring the cold-flame reaction. The temperature of the fuel entering the cold-flame vaporizer 14*a* can be anywhere between ambient and its boiling point.

As described above, the cold-flame vaporization process partially oxidizes the fuel. The partial oxidization of the fuel is supported through a simplified heat balance for the cold-flame vaporizer 14*a*. The heat within the cold-flame vaporizer 14*a* is dividable into three heat fluxes: overheating of air and steam from inlet to outlet temperature ($Q_1$), estimation of heat loss to the periphery considering the outlet temperature without a reaction and vaporization ($Q_2$) and heating of the fuel from boiling to outlet temperature ($Q_3$). The heat fluxes are respectively represented by the following equations:

$$Q_1 = (m_{air}c_{p,air} + m_{steam}c_{p,steam})(T_{outlet} - T_{inlet})$$

$$Q_2 = (m_{air}c_{p,air} + m_{steam}c_{p,steam})(T_{inlet} - T_{outlet,\,wo\,reaction})$$

$$Q_3 = m_{fuel}[c_{p,fuel,liq}(T_{boiling} - T_{inlet\,fuel}) + r_0 + c_{p,fuel,vapor}(T_{outlet} - T_{boiling})]$$

wherein:

Q=heat flowrate m=mass flowrate

T=temperature $c_p$=specific heat $r_0$=heat of vaporization

Further, the thermal power of a specified fuel is provided as:

$$Q_{fuel,in} = n_{fuel,in} LHV_{fuel}$$

wherein:

n=molar flowrate

LHV=lower heating value

Dividing the sum of the three heat fluxes by the thermal power of the fuel gives the oxidization rate (U) of the cool-flame reaction. Expressed in a percentage, the oxidization rate (U) is provided as:

$$U = [(Q_1 + Q_2 + Q_3)/Q_{fuel,in}] \times 100\%$$

The first and third heat fluxes relate to the cold-flame reaction independent of the specifics of the cold-flame vaporizer 14*a* within which the reaction occurs. Further, the first and third heat fluxes are dependent upon the inlet conditions and the thermodynamic properties of air, steam and the particular fuel. The second heat flux represents heat loss to the periphery and is dependent upon the particular characteristics of the cold-flame vaporizer 14a (e.g. insulation, geometry, etc.). Therefore, although the second heat flux is not measurable in the functioning apparatus, it influences fuel conversion therein and must be considered.

Figure 4:
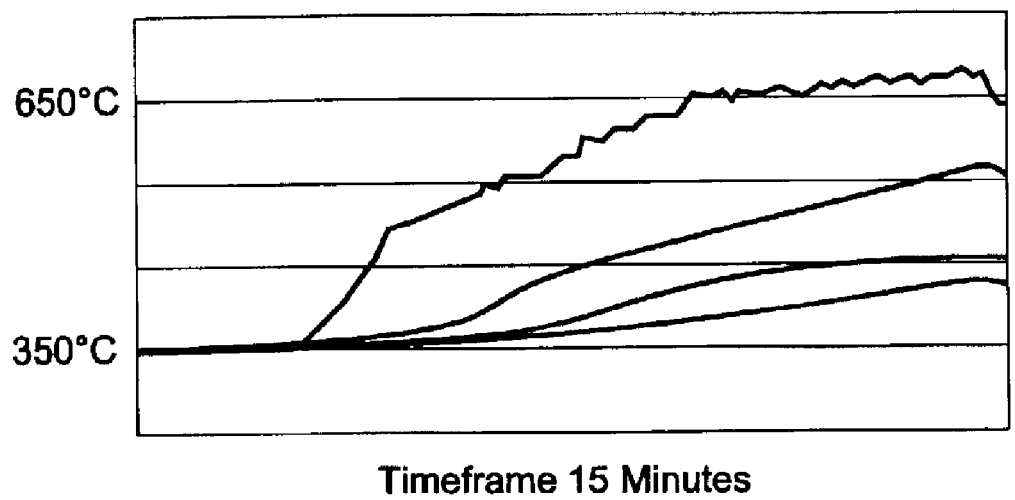
FIG. 4 is a graph detailing temperature characteristics within an outlet of a traditional vaporizer.
Figure 5:
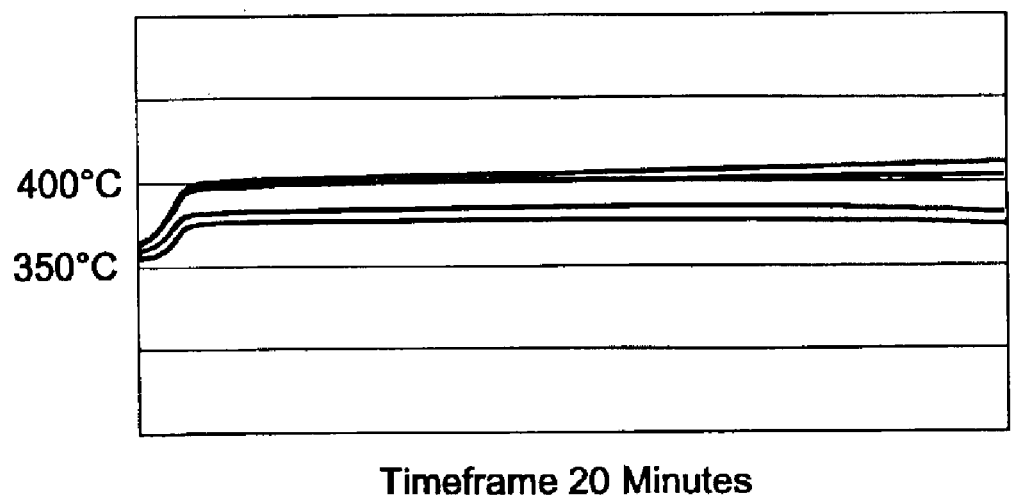
FIG. 5 is a graph detailing temperature characteristics within an outlet of the cold-flame vaporizer.

With particular reference to FIGS. 4 and 5, a temperature comparison is provided between a conventional vaporizer and the cold-flame vaporizer 14a. For each figure, the temperature of the respective outlet of the vaporizer, to the auto-thermal reformer, was measured at four points. As shown, the conventional vaporizer includes a non-uniform temperature profile achieving a temperature in the auto-ignition range (i.e. above 500° C.). In comparison, the cold-flame vaporizer includes a uniform temperature profile achieving a temperature above the required auto-thermal temperature (350° C.), while remaining sufficiently below the auto-ignition temperature. Further, the temperature variation across the outlet signifies the quality of vaporization and mixture therein, whereby a uniform temperature across the outlet indicates a higher quality of vaporization and mixing. The quality of $H_2$ production within the auto-thermal reformer 14b is dependent upon the efficiency of the auto-thermal reformer 14b. As mentioned previously, the efficiency of the auto-thermal reformer 14b is dependent upon the temperature at which the reactants enter the auto-thermal reformer 14b.

Figure 6:
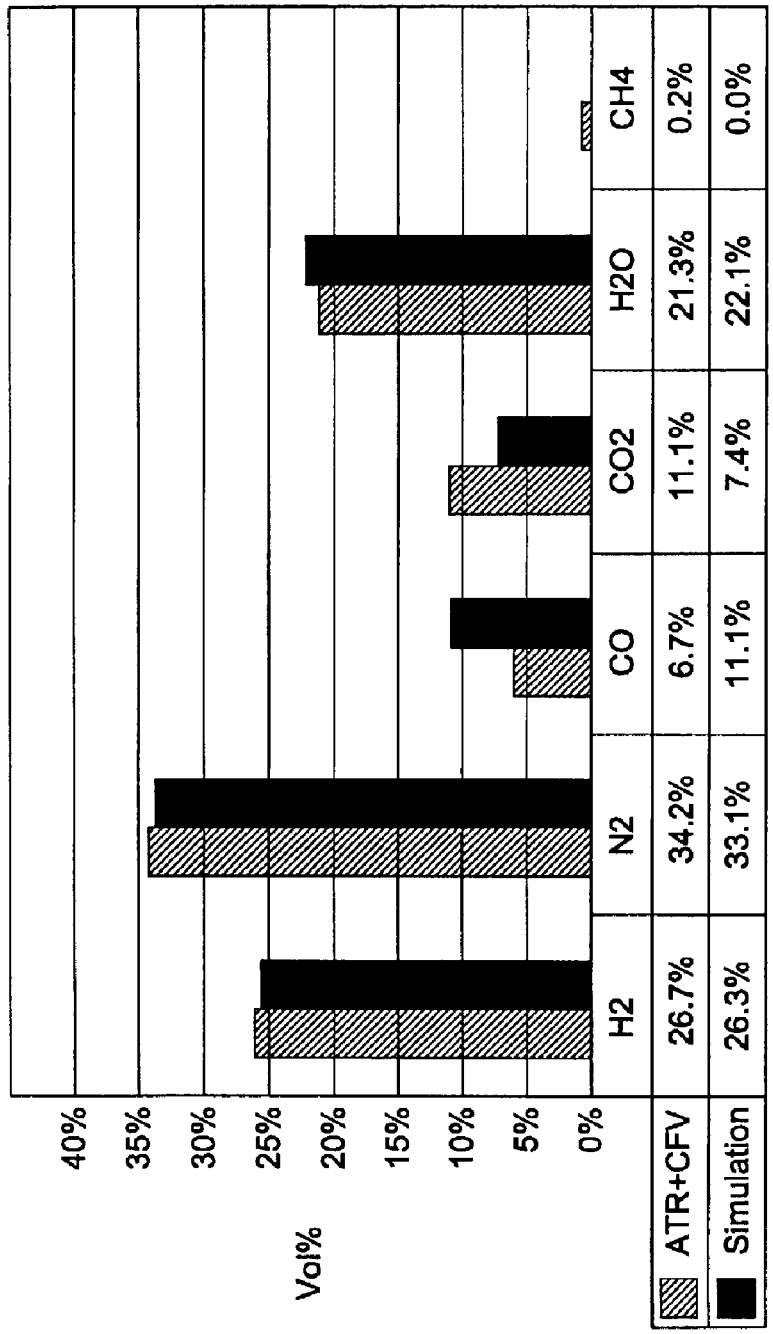
FIG. 6 is a graph comparing volume percentages of reformate stream components produced through an ideal reformation process and volume percentages of reformate stream components produced through a combined cold-flame vaporization and reformation process.

With reference to FIG. 6, a comparison of resultant reformate components is provided as between a theoretical auto-thermal reformation process and an auto-thermal reformation process implementing cold-flame vaporization. The theoretical auto-thermal reformation process is based upon an adiabatic, ideal auto-thermal reformation process for achieving optimal volume concentrations for the reformate components. The cold-flame vaporization process was performed for gasoline ($C_{7.45}H_{14.5}$) with O/C=1.0, S/C=1.6 and pressure=1.8 bar-g. The significant component is the concentration of $H_2$, as $H_2$ is desired for use in the fuel cell stack 20. As shown, the ideal theoretical value for $H_2$ is given as 26.3% while the auto-thermal reformation process, implementing the cold-flame vaporization process, achieves a value of 26.7%. Thus, it has been shown that implementation of the cold-flame vaporizer 14a enables achievement of optimal $H_2$ concentration within the resultant reformate stream.

As described above, the present invention combines the cold-flame vaporizer 14a and the auto-thermal reformer 14b into a single unit (see FIG. 1). In this manner, the functions of vaporizing, mixing and reforming are combined in the single unit, thereby reducing the overall volume and weight of the system 10. Further, the present invention provides specific operational parameters, within which the cold-flame vaporizer 14a must operate to ensure the cold-flame reaction for transient applications. Controlling the O/C, S/C and pressure parameters within the single unit enables control of the transient reformation process for reducing the risk of catalyst damage and unwanted reactions therewithin.

As described hereinabove, the present invention establishes concentration and pressure ranges to enable vaporization of fuel and superheating of saturated steam over a wide range of flow rates while preventing auto-ignition. Further, the ranges so established by the present invention enable the supply of an essentially homogeneous reformate stream to the auto-thermal reformer 14b at a desired temperature for optimized reformation therein. More specifically, the selected O/C, S/C, and pressure ranges permit operation over a system turndown ratio of at least 5, desirably at least 10, preferably 20, and most preferably 30. As used herein, the term turndown ratio refers to the modulation capability expressed as mass flow per unit of time of the total flows to the vaporizer. As such, when the inputs are an oxidant and a hydrocarbon fuel, the turndown ratio is based upon the mass flow rates of the oxidant and the hydrocarbon fuel. When the inputs are an oxidant, a hydrocarbon fuel and saturated steam (which is superheated), the turndown ratio is based on the mass flow rates of the oxidant, the hydrocarbon fuel and the saturated steam. A turndown ratio of 30 or 30:1, for example, means that on the basis of one mass flow unit per time, the maximum flow is up to 30 times as great as the minimum. Thus, the system is operable to supply the reformer under transient conditions where the total mass flow rate to the vaporizer varies by a factor of up to 30, and hence, such vaporizer outlets supplied to the reformer has a mass flow rate which also varies by a factor of 30.

Although the present invention, as described herein, includes vaporizing liquid fuel and superheating saturated steam within the cold-flame vaporizer 14a, it is expected that water forms a part of the input supplied to the vaporizer 14a, for vaporization therein, since equilibrium exists between liquid water and water vapor as determined by pressure and temperature. Accordingly, the heat generated through oxidization is used to vaporize any combination of the following: vaporize liquid fuel, vaporize any liquid water to steam, and superheat any steam. The inlet stream of water in both liquid and vapor form must be sufficient to provide a resultant S/C ratio within 1.5 to 3.0, as discussed in detail hereinabove.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system to satisfy transient loads wherein said system comprises a reformer producing a hydrogen-containing reformate stream which is consumed in a fuel cell stack to satisfy the transient load, said method comprising the steps of:

providing a cold-flame vaporizer;

supplying to said cold-flame vaporizer a hydrocarbon liquid inlet stream at a first mass flow rate and an oxidant inlet stream at a second flow mass rate, said oxidant comprising oxygen;

at least partially oxidizing a portion of the hydrocarbon liquid within the cold-flame vaporizer to transfer heat to a remaining portion of the hydrocarbon liquid causing vaporization thereof, thereby producing an outlet stream comprising vaporized fuel;

varying said first and second flow rates while controlling an oxygen to carbon molar ratio within said cold-flame vaporizer within a range sufficient to cause said vaporization of said remaining portion of hydrocarbon liquid without causing auto-ignition thereof, and to maintain said outlet stream within a first temperature range; and reforming said outlet stream in a reformer to produce the reformate steam for consumption in said stack to satisfy the transient load.

2. The method of claim 1 wherein said oxygen to carbon molar ratio is in a range of about 0.5 to about 2.3.

3. The method of claim 1, further comprising the steps of:

supplying an inlet stream comprising saturated steam at a third mass flow rate into said cold-flame vaporizer;

heating said inlet stream concurrently with said remaining hydrocarbon liquid portion; and varying said third flow rate while controlling a steam to carbon molar ratio with a range sufficient to superheat said saturated steam.

4. The method of claim 3, wherein said range of said steam to carbon molar ratio is between 1.5 and 3.0.

5. The method of claim 1, further comprising the step of controlling a pressure within said cold-flame vaporizer within a range of approximately 1.5 to 3.0 bar-gauge.

6. The method of claim 1 wherein said first and second mass flow rates constitute a total mass flow rate, and wherein a maximum total mass flow rate is greater than 5 times a minimum total mass flow rate.

7. The method of claim 3 wherein said first, second and third mass flow rates constitute a total mass flow rate, and wherein a maximum total mass flow rate is at least 20 times greater than a minimum total mass flow rate.

* * * * *